United States Patent [19]

Conlon et al.

[11] 4,366,602
[45] Jan. 4, 1983

[54] METAL TIE

[75] Inventors: Thomas Conlon, Oak Forest; Jack E. Caveney, Hinsdale, both of Ill.

[73] Assignee: Panduit Corp., Tinley Park, Ill.

[21] Appl. No.: 178,206

[22] Filed: Aug. 14, 1980

Related U.S. Application Data

[63] Continuation of Ser. No. 958,296, Nov. 6, 1978, abandoned.

[51] Int. Cl.$^3$ ............................ B65D 63/08; F16L 3/08
[52] U.S. Cl. ...................................... 24/25; 24/136 A; 248/74 PB
[58] Field of Search ...................... 24/136 A, 25, 16 R; 248/74 PB, 74 R, 74 B

[56] References Cited

U.S. PATENT DOCUMENTS

| | | | |
|---|---|---|---|
| 28,187 | 5/1860 | Loughborough | 24/25 |
| 225,517 | 3/1880 | Gilman | 24/244 |
| 1,271,912 | 7/1918 | Kemper | 403/384 |
| 2,491,290 | 12/1949 | Tinnerman | 24/16 R |
| 3,047,651 | 7/1962 | Hawkes | 403/368 X |
| 3,086,267 | 4/1963 | Mathes | 24/136 A X |
| 3,276,085 | 10/1966 | Spranger | 24/25 X |
| 4,128,220 | 12/1978 | McNeel | 248/74 PB X |

Primary Examiner—J. Franklin Foss
Attorney, Agent, or Firm—Charles R. Wentzel; Richard B. Wakely

[57] ABSTRACT

A tie for forming a plurality of elongate objects into a bundle and for holding a pair of objects together. The tie of the present invention comprises an elongate strap, a locking head joined to one end of the strap for receiving the other end of the strap and roller means disposed entirely within the locking head for lockingly engaging the strap. The head includes a strap entry face, a strap exit face and a strap-receiving aperture extending therebetween and further includes a floor and a roof which diverge in the direction of the exit face. The locking head also has retention means for retaining the roller means inside the head. The roller means is movable between a threading position wherein it is disposed adjacent the exit face and a locking position wherein it is closer the entry face and concurrently engages the roof and the strap to wedge the strap so that threading of the strap moves the roller means towards its threaded position and release of the tensioned strap causes the roller means to move toward its locking position to retain the strap in the locking head.

3 Claims, 8 Drawing Figures

U.S. Patent  Jan. 4, 1983  Sheet 1 of 2  4,366,602
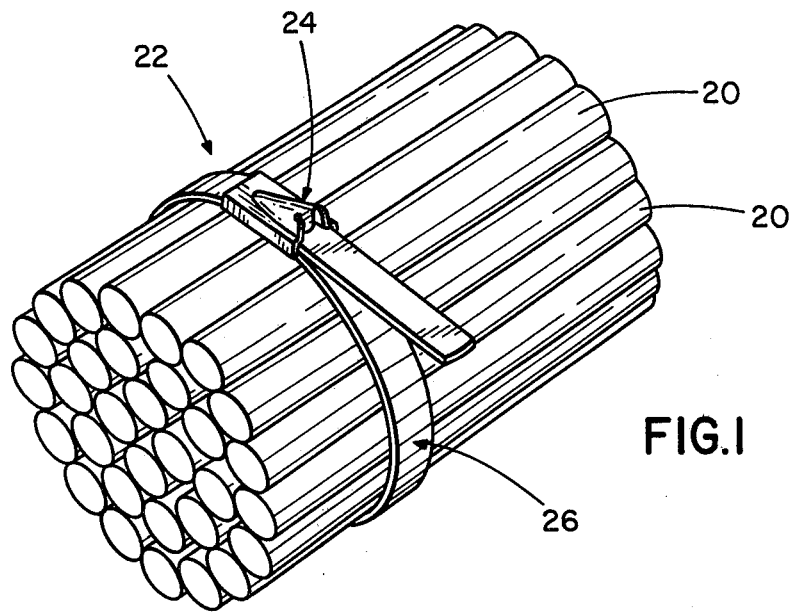
FIG.1
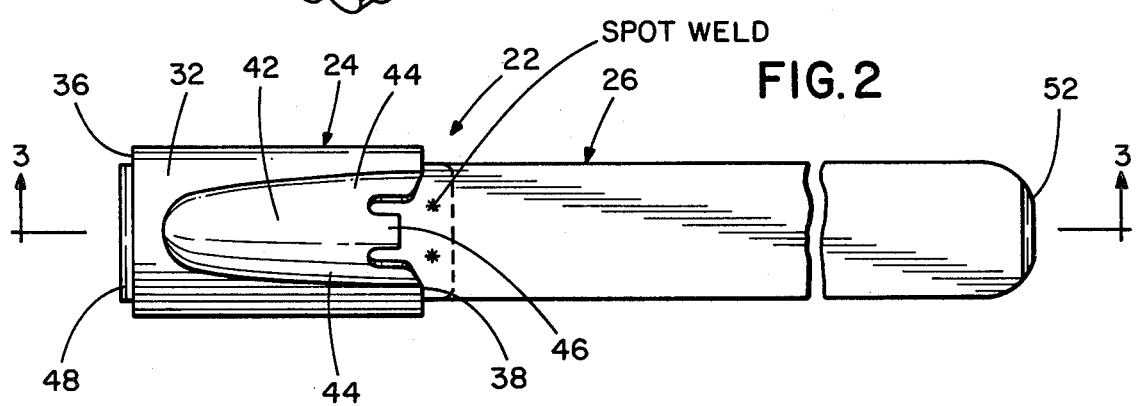
FIG.2
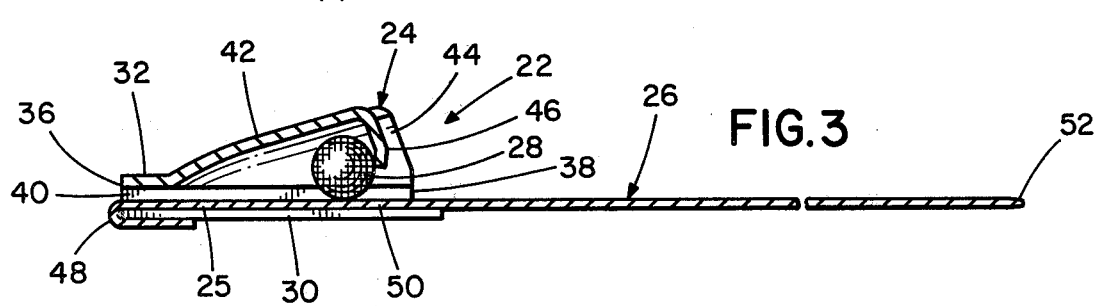
FIG.3
FIG.4
FIG.5

METAL TIE

This is a continuation of application Ser. No. 958,296, filed Nov. 6, 1978, now abandoned.

BACKGROUND

The present invention relates generally to bundling and attachment devices and more specifically to a tie for forming a plurality of elongate objects into a bundle and for holding a pair of objects together.

Plastic cable ties have become increasingly popular for a variety of bundling and attachment applications because of their relatively low initial cost and their ease of installation. For certain applications, however, it is more desirable to use a metallic tie. More specifically, plastic straps tend to become brittle when used at low temperature and have less desirable aging characteristics than comparable metal straps; e.g., when used in a high temperature, high humidity environment, plastic ties may undergo some elongation. Additionally, plastic ties are inappropriate for certain nuclear powerplant applications since radiation can result in degradation of the plastic material thereby rendering the strap more brittle. Also, where it is desired to use the tie as a load carrying member, the metal tie is often preferable since it has much greater tensile strength.

Several self-locking bundling devices formed from metal have been proposed. In one type a plurality of regularly spaced vanes extend at an angle from the strap surface. During application, portions of the strap must be overlapped so that the vanes interleave. It will be appreciated that overlapping requires the use of a somewhat longer strap and metallic vanes extending from the strap could damage the insulation of wires in adjacent bundles. In another type of metallic tie the strap portion has a series of abutments which sequentially deflect a tongue in the locking head of the tie during threading. Examples of such ties are disclosed in U.S. Pat. Nos. 3,311,957, 3,694,863 and 3,964,133.

In one prior art bundling device a roller pin is used to wedge the strap against components of the locking head. Such a tie was relatively time consuming in use because it included several loose parts which required careful manual assembly. Additionally, it was possible to inadvertently release the strap because portions of the pin extended beyond the locking head. Reference may be made to U.S. Pat. No. 2,491,290.

SUMMARY OF THE INVENTION

Among the several objects of the present invention may be noted the provisions of an improved self-locking tie for forming objects into a bundle and for holding a pair of objects together; the provision of such a tie which makes it satisfactory for use in high temperature, low temperature and other harsh environments; the provision of such tie which requires extremely low threading force and which permits tightening without damaging the held objects; and the provision of such a tie which has high tensile strength, is lightweight, has long service life and is simple and economical to manufacture. Other objects and features will be in part apparent and in part pointed out.

Briefly, the tie includes an elongate strap, a locking head joined to one end of the strap for receiving the other end of the strap and roller means disposed entirely within the locking head for holding the strap. The head includes strap entry and exit faces, a strap-receiving aperture extending between the faces, and a floor and a roof which diverge in the direction of the exit face. The head also includes retention means for retaining the roller means within the head. The roller means is movable between a threading position wherein it is adjacent the exit face and a locking position wherein it is closer the entry face than in its threading position and concomitantly engages the roof and the strap to wedge the strap.

BRIEF DESCRIPTION OF THE DRAWINGS

FIG. 1 is a perspective view of the metal tie of the present invention, comprising a locking head holding a locking ball and a strap body attached to the head, forming wires into a bundle;

FIG. 2 is a plan view of the metal tie of FIG. 1;

FIG. 3 is a longitudinal cross-sectional view of the tie of FIG. 2 taken generally along line 3—3;

FIG. 4 is a plan of the blank from which the locking head is formed;

FIG. 5 is an end view of the locking head of the present invention;

Corresponding reference characters indicate corresponding components throughout the several views of the drawings.

DESCRIPTION OF THE PREFERRED EMBODIMENT

Figure 7:
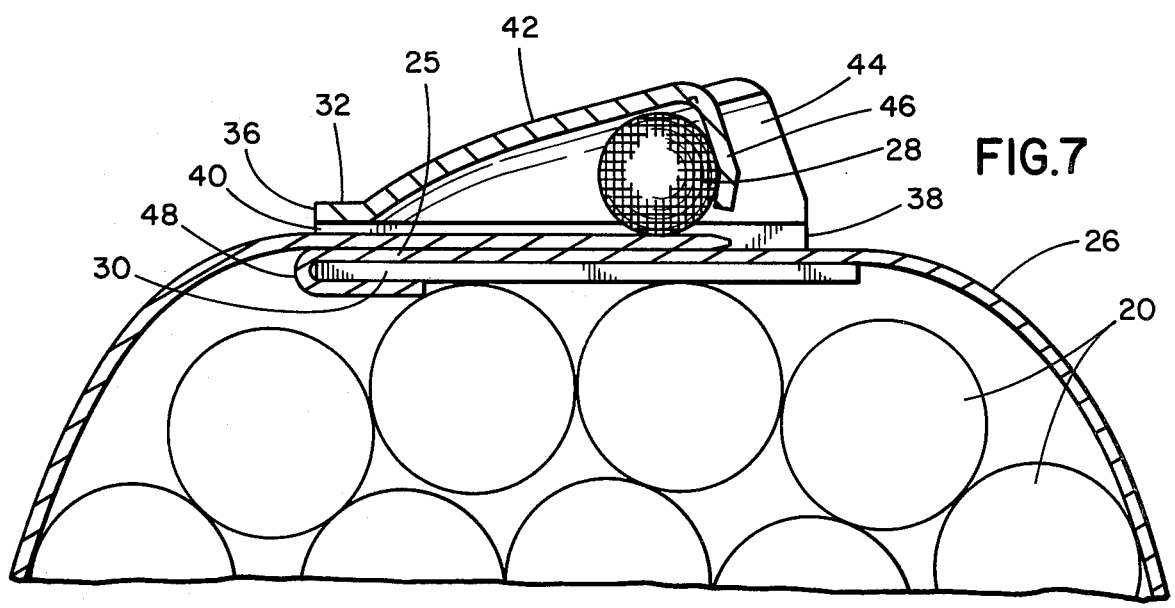
FIG. 7 is an enlarged cross-sectional view through the locking head showing the pawl moved to its threading position in response to threading of the strap.
Figure 8:
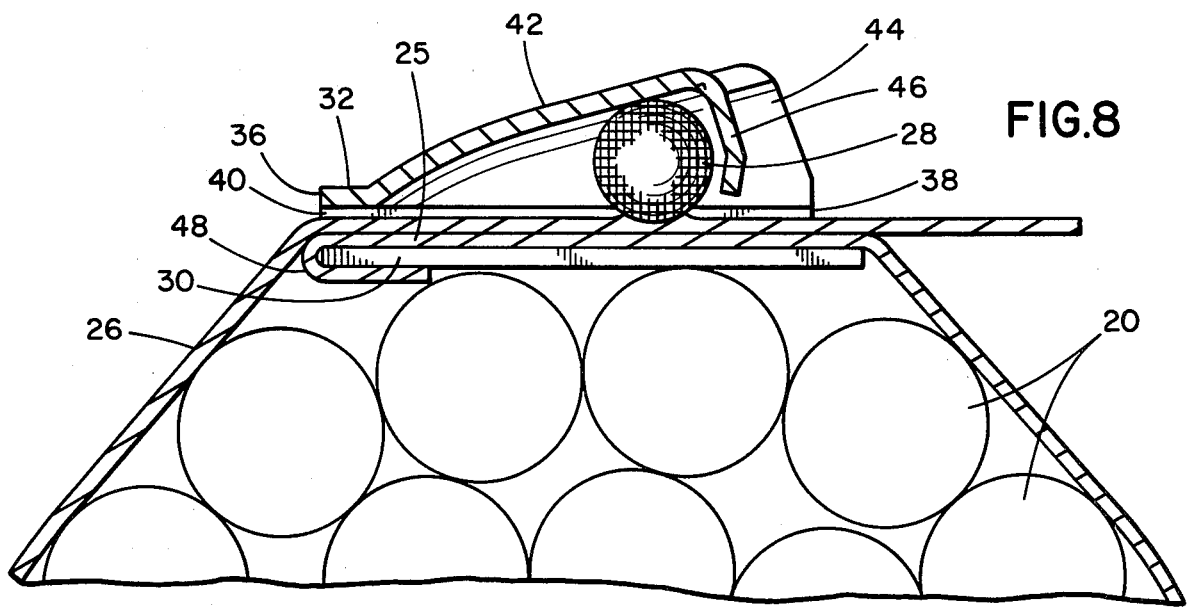
FIG. 8, similar to FIG. 7, illustrates the locking ball moved to its locking position to prevent retrograde movement of the strap.

Referring now to the drawings, a cable tie for forming a plurality of elongate objects, such as wires 20 shown in FIGS. 7 and 8, is generally indicated in FIGS. 1–3 by reference numeral 22. Tie 22 includes a locking head 24 joined to one end 25 of an elongate strap 26 and a ball or sphere 28 retained within the head for locking the strap within the head. Preferably the ball, head and strap are formed of stainless steel to allow the tie to be used over a wide temperature range and give the tie high strength and excellent resistance to corrosion.

More specifically, locking head 24 comprises a floor 30, a ceiling 32, and a pair of side walls 34 interconnecting the floor and ceiling. Head 24 further includes strap entry and exit faces, 36 and 38 respectively, and a strap-receiving aperture 40 extending between the faces and partially defined by the side walls and ceiling. The locking head also comprises a roof 42 which overlies floor 30 and diverges therewith in the direction of exit face 38. One end of roof 42 joins ceiling 32 with spaced side wings 44 connecting other parts of the roof and ceiling. Roof 42 is arcuate to provide the inside surface of the roof with a shape complimentary to that of ball 28 which it engages. Extending from roof 42 toward floor 30 and adjacent exit face 38 is means for retaining the ball within the head in the form of a finger 46.

Referring to FIG. 4, a flat metal blank is shown from which locking head 24 is formed. The blank or components thereof generally corresponding to the head or components thereof except for folding or bending are designated by applying a prime (') to the reference character given the locking head or component thereof.

Tie 22 also comprises means for retaining head 24 at strap end 25 to preclude sliding of the head relative to the strap. As best shown in FIG. 3, end 25 of strap 26 includes head retaining means in the form of a hooked portion 48 for receiving and holding floor 30 adjacent strap entry face 36. If desired for extra strength, hooked portion 48 can be crimped about the floor and/or the strap could be welded to the floor. Also another hooked portion or stop could be struck from strap 26 to hold floor 30 adjacent strap exit face 38. Strap end 25 also includes a portion 50 underlying roof 42, and, with ceiling 32 and side walls 34, defining strap-receiving aperture 40. The remainder of strap extends from the locking head and terminates in a tip 52, tapered by coining, for reception into the locking head.

Ball 28 which constitutes roller means, captively held within the locking head by finger 46, has a textured or roughened surface to increase the coefficient of friction between the ball and the roof or the strap. Referring to FIGS. 7 and 8, the ball is movable from a threading position, wherein it concurrently engages finger 46 and the threaded strap but is preferably slightly spaced from roof 42, toward a locking position in which the ball is closer strap entry face 36 and concurrently engages roof 42 and the strap to wedge the strap against floor 30 to prevent retrograde movement of the strap in the locking head. As used herein, the word "wedge" is to be accorded its broad meaning and simply indicates that in the locking position of the ball the strap is squeezed or compressed. More specifically, in its locking position ball 28 pushes the portion of the strap 26 inserted under the ball against strap end 25 which is in turn pushed against floor 30. It should be appreciated that ceiling 32 and more particularly the portions of the ceiling adjacent the strap exit face which diverge to straddle roof 42 constitute means for limiting movement of the strap toward the roof during threading. Tapered tip 52 and ceiling 32 thus cooperate to insure that, during threading, the ball is engaged beneath its center of gravity so that it will be lifted to its threading position.

Operation of tie 22 is as follows: After strap 26 is deflected from its as-formed condition to encompass objects 20, strap tip 52 is inserted into strap-receiving aperture 40. As threading continues, strap 26 engages ball 28 to lift it and move it toward its threading position shown in FIG. 7. It will be appreciated that threading of the strap requires very low force as ball 28 can roll on the strap during threading. This is to be contrasted with prior art ties requiring much higher threading force wherein a locking tongue, biased to its locking position, had to be forcefully deflected to its threading position. After the strap is tightened to a predetermined level, release of the strap causes the threaded strap portion and the ball to move toward the strap entry face 36 until the ball simultaneously engages roof 42 and the strap. As shown in FIGS. 7 and 8 the travel of the ball between its threading position and locking position is very short. When the ball is in its locking position, the frictional engagement between the ball and the roof and between the ball and the strap is sufficient to prevent rolling of the ball thus causing the strap to be tightly wedged against floor 30. The ball, upon incipient locking, effects permanent deformation of the strap by indentation causing strap material previously underneath the ball to cold flow in effect forming a rim about the indentation.

Figure 6:
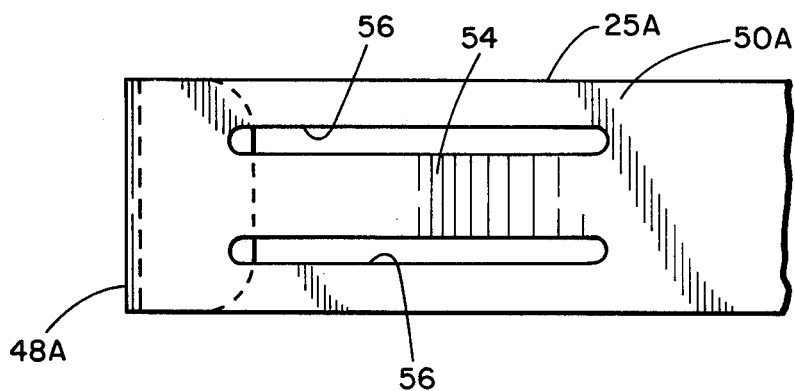
FIG. 6 is a plan view of an alternate embodiment of the strap.

If locking head 24 were placed in the unusual position wherein it was inverted and inclined with the strap extending generally downwardly, it is possible that ball 28 could rest against finger 46 and roof 42 without engaging the threaded strap. Not only is this disposition of the locking head unusual but as the strap is deflected and inserted in the locking head, the strap will generally be bowed so as to always engage the ball when the excess threaded portion of the strap is not held. An alternate embodiment of the strap is shown in FIG. 6 which insures the threaded strap is always engaged by the ball without regard to the posture of the head, at the expense of slightly increased strap threading force. Components of strap 26A corresponding to components of previously described strap 26 are denoted by the addition of the suffix "A". Strap 26A includes a portion 50A underlying roof 42 including an upwardly bowed beam spring 54 defined by a pair of spaced elongate slots 56. Spring 54 functions to push strap 26 into contact with ball 28 during threading. As the ball moves to its locking position spring 54 is flattened against floor 30. The operation of a tie comprising strap 26A is otherwise substantially identical to that previously described. The spring constant of beam spring 54 can be varied by adjusting the thickness of the spring and the length of slots 56.

It should be noted that in all its positions ball 28 is entirely disposed within the locking head thereby making the tie of the present invention susceptible for use with a strap-tightening tool of the well-known type which reacts against the locking head's exit face to tighten the strap and is responsive to the development of a predetermined tension in the strap to sever the excess threaded portion of the strap generally flush with the strap exit face. Such a tool is described in commonly assigned U.S. patent application Ser. No. 836,272 filed 9/26/77 and U.S. Pat. No. 3,661,187. Although, as previously pointed out, the travel of the ball is relatively short, it is sufficient for the severed end of the strap to withdraw between side wings 44 to prevent the sharp end from cutting the user or the insulation of wires in adjacent bundles.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A tie for forming a plurality of elongate objects into a bundle and for holding a pair of objects together, said tie comprising:
   at least one elongate metallic strap;
   a metallic locking head disposed adjacent one end of a strap for receiving another end of a strap and comprising a strap entry face, a strap exit face and a strap-receiving aperture extending therebetween and further comprising a floor and a roof which diverge in the direction of said exit face; and
   metallic roller means for lockingly engaging a strap, said head comprising retention means for retaining said roller means, said roller means being movable between a threading position wherein said roller means is disposed adjacent said exit face and a locking position wherein said roller means is closer said entrance face, said tie comprising means for causing a threaded strap in all of its positions to be maintained in engagement with said roller means without regard to the posture of said head whereby said tie is positive locking.

2. A tie as set forth in claim 1 wherein the last-mentioned means comprises a bowed portion of a strap which is at least partially flattened when said roller means is in its locking position.

3. A tie as set forth in claim 1 wherein said roller means is not connected to any component of said head whereby, prior to threading of said strap, said roller means is freely movable within said locking head.

* * * * *

REEXAMINATION CERTIFICATE (2301st)

United States Patent [19]
Conlon et al.

[11] B1 4,366,602
[45] Certificate Issued  May 17, 1994

[54] METAL TIE

[75] Inventors: Thomas Conlon, Oak Forest; Jack E. Caveney, Hinsdale, both of Ill.

[73] Assignee: Panduit Corp., Tinley Park, Ill.

Reexamination Request:
No. 90/002,942, Jan. 28, 1993

Reexamination Certificate for:
Patent No.: 4,366,602
Issued: Jan. 4, 1983
Appl. No.: 178,206
Filed: Aug. 14, 1980

Related U.S. Application Data

[63] Continuation of Ser. No. 958,296, Nov. 6, 1978, abandoned.

[51] Int. Cl.⁵ ............... B65D 63/08; F16L 3/08
[52] U.S. Cl. .................................. 24/25; 24/136 A
[58] Field of Search ............... 24/25, 136 A, 16 R

[56] References Cited

U.S. PATENT DOCUMENTS

| | | |
|---|---|---|
| 25,125 | 8/1859 | Knowles . |
| 28,187 | 5/1860 | Loughborough . |
| 204,965 | 6/1878 | Gilman . |
| 205,720 | 7/1878 | Blossom . |
| 225,517 | 3/1880 | Gilman . |
| 296,686 | 4/1884 | Gresham . |
| 331,088 | 11/1885 | Sackett . |
| 980,700 | 1/1991 | Swafford . |
| 1,271,912 | 7/1918 | Kemper . |
| 1,628,744 | 5/1927 | Rose . |
| 3,434,686 | 3/1969 | Aoi . |
| 4,074,916 | 2/1978 | Schindler . |
| 4,085,848 | 4/1978 | Tsuge . |

FOREIGN PATENT DOCUMENTS

| | | |
|---|---|---|
| 312969 | 1/1914 | Fed. Rep. of Germany . |
| 89366 | 4/1957 | Norway . |

*Primary Examiner*—Alvin Chin-Shue

[57] ABSTRACT

A tie for forming a plurality of elongate objects into a bundle and for holding a pair of objects together. The tie of the present invention comprises an elongate strap, a locking head joined to one end of the strap for receiving the other end of the strap and roller means disposed entirely within the locking head for lockingly engaging the strap. The head includes a strap entry face, a strap exit face and a strap-receiving aperture extending therebetween and further includes a flood and a roof which diverge in the direction of the exit face. The locking head also has retention means for retaining the roller means inside the head. The roller means is movable between a threading position wherein it is disposed adjacent the exit face and a locking position wherein it is closer the entry face and concurrently engages the roof and the strap to wedge the strap so that threading of the strap moves the roller means towards its threaded position and release of the tensioned strap causes the roller means to move toward its locking position to retain the strap in the locking head.

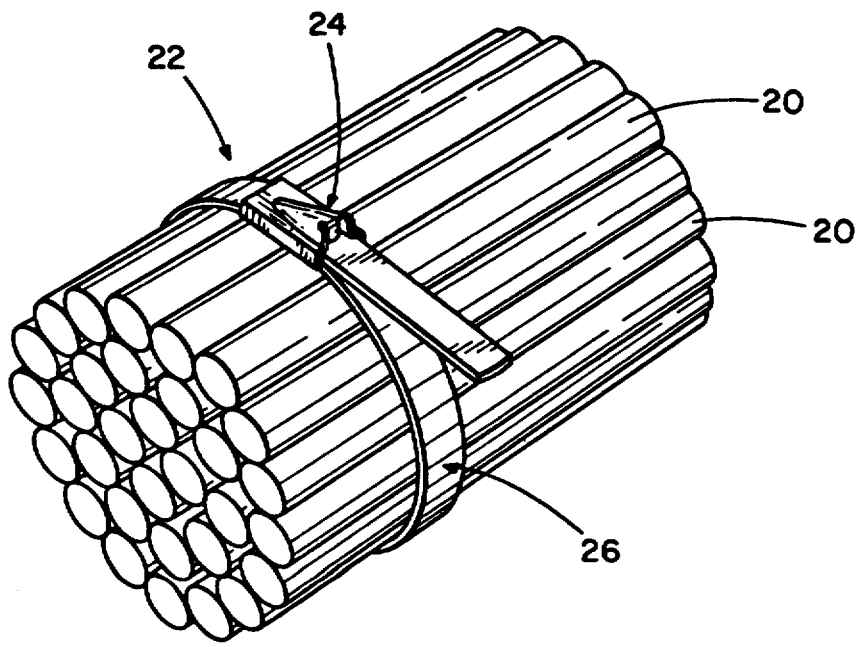

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2 and 3, dependent on an amended claim, are determined to be patentable.

New claims 4 and 5 are added and determined to be patentable.

1. A tie for forming a plurality of elongate objects into a bundle and for holding a pair of objects together, said tie comprising:
   at least one elongate metallic strap;
   a metallic locking head disposed adjacent one end of a strap for receiving another end of a strap and comprising a strap entry face, a strap exit face and a strap-receiving aperture extending therebetween and further comprising a floor and a roof which diverge in the direction of said exit face; and
   metallic roller means for lockingly engaging a strap, said head comprising retention means for retaining said roller means, said roller means being movable between a threading position wherein said roller means is disposed adjacent said exit face and a locking position wherein said roller means is closer said entrance face, said tie comprising *spring means formed in a portion of said strap* for causing a threaded strap in all of its positions to be maintained in engagement with said roller means without regard to the posture of said head whereby said tie is positive locking.

*4. A tie for forming a plurality of elongate objects into a bundle and for holding a pair of objects together, said tie comprising:*
   *at least one elongate metallic strap;*
   *a metallic locking head disposed adjacent one end of a strap for receiving another end of a strap and comprising a strap entry face, a strap exit face and a strap-receiving aperture extending therebetween and further comprising a floor and a roof which diverge in the direction of said exit face; and*
   *metallic roller means for lockingly engaging a strap, said head comprising retention means for retaining said roller means, said roller means being movable between a threading position wherein said roller means is disposed adjacent said exit face and a locking position wherein said roller means is closer said entrance face, said tie comprising means for causing a threaded strap in all of its positions to be maintained in engagement with said roller means without regard to the posture of said head whereby said tie is positive locking; wherein the last-mentioned means comprises a bowed portion of a strap which is at least partially flattened when said roller means is in its locking position.*

*5. A tie as set forth in claim 1 wherein said spring means underlies said roof.*

* * * * *